Sept. 20, 1966 T. V. SIKINA 3,274,453

SEMICONDUCTOR INTEGRATED STRUCTURES AND METHODS FOR THE FABRICATION THEREOF

Filed Feb. 20, 1961 2 Sheets-Sheet 1

INVENTOR.
THOMAS V. SIKINA

BY Albert L. Free

AGENT

INVENTOR.
THOMAS V. SIKINA
BY
Albert L. Free
AGENT 3,274,453
Patented Sept. 20, 1966

3,274,453

SEMICONDUCTOR INTEGRATED STRUCTURES AND METHODS FOR THE FABRICATION THEREOF

Thomas V. Sikina, Willow Grove, Pa., assignor, by mesne assignments, to Philco Corporation, Philadelphia, Pa., a corporation of Delaware Filed Feb. 20, 1961, Ser. No. 90,580
5 Claims. (Cl. 317—234)

Figure 1:
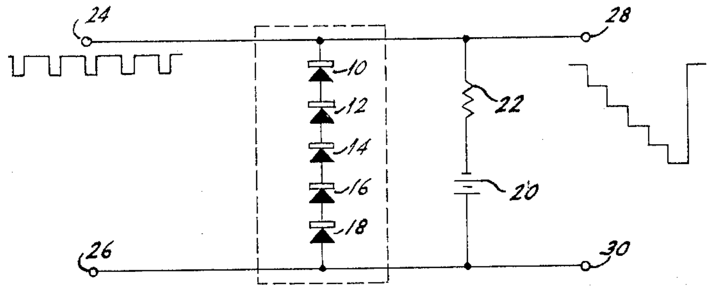

This invention relates to semiconductor structures and to methods for their manufacture, and particularly to microminiaturized semiconductor circuit assemblies and methods for producing them simply, reliably and in improved form.

Microminiaturization of semiconductor assemblies has recently become of particular importance in applications such as missile control and guidance where small volume, small weight and high resistance to mechanical shock are of primary importance in electrical apparatus. To achieve the ultimate in such microminiaturization it is necessary to eliminate the separate housings normally used for semiconductor devices such as diodes and transistors, and to include the individual elements of the semiconductor devices and their interconnections as integral constituent parts of the complete assembly. While a variety of such methods have been proposed heretofore, none of these have been completely satisfactory from the standpoints of producing sufficiently small assemblies easily, reproducible and reliable while providing for efficient removal from the assembly of heat generated therein during operation.

Accordingly it is an object of my invention to provide a novel method for making semiconductor circuit assemblies of small size and weight easily, reproducibly and reliably.

Another object is to provide a novel method for making microminiaturized semiconductor circuit assemblies which is especially adapted for mass production.

It is another object to provide such a method in which the final circuit assembly is especially adapted for the removal thereform of heat generated in the assembly.

A further object is to provide a new and improved unitary assembly of semiconductor circuit elements.

Another object is to provide such an assembly which is reliably reproducible, extremely compact and stable when subjected to high accelerations.

It is another object to provide such an assembly which is especially adapted to faciliate the removal therefrom of heat generated therein.

In accordance with the invention the above objects are achieved by providing on one side of a unitary semiconductor assembly a plurality of connections to semiconductive material so located that portions of said connections which are to be interconnected lie in a common plane, covering said portions of said connections with an adhering, insulating surround extending between those connections to be interconnected so that paths in said surround and in said plane extend between said connections, removing part of said surround and of said connections to expose a surface of said surround and of said portions of said connections lying in said common plane, and depositing on said exposed surface suitable interconnections between said portions of said connections.

In a preferred form of the invention a wafer of semiconductive material is first provided with a surface layer suitable for use as the base region of semiconductor diode or transistor devices. Discrete metal deposits are applied to this layer in predetermined locations, as by evaporation and subsequent alloying, so as to form rectifying and ohmic connections to the layer and so that metallic portions of these connections extend above the surface of the wafer and lie in a common plane. Parts of the base layer which are to be electrically isolated from each other are separated by cutting appropriate channels through the surface layer, as by sandblasting or etching. A surround material which is an insulator when solid is then applied in liquid form over the deposits and the intervening portions of the wafer so as to extend from the surface of the wafer to beyond the common plane intersecting the connections. The surround is then solidified and removed progressively from the exterior along a plane parallel to said common plane, as by lapping or milling, until a planar surface of the assembly coinciding with said common plane is exposed. This exposed planar surface is made up of the insulating surround and the metal portions of the connections to the semiconductive wafer. Appropriate interconnections between predetermined ones of the metal connections may then be deposited, as by evaporation of metal through a mask, to form the desired circuit such as a counter or multivibrator for example.

Because the interconnections are deposited upon a planar surface, reliable and reproducible low-resistance electrical interconnections are readily made, in contrast to the unreliable and/or high-resistance interconnections which often result if deposition is attempted upon a surface which is non-planar. Furthermore, since the insulating surround covers the critical regions where the rectifying connections meet the semiconductor, these regions are protected from deleterious environmental contaminants. Finally, since the entire circuit assembly can be constructed by operations performed on one side only of the semiconductive wafer the process lends itself especially well to mass production techniques and to mounting so that heat generated therein during operation can readily be conducted away.

Figure 2:
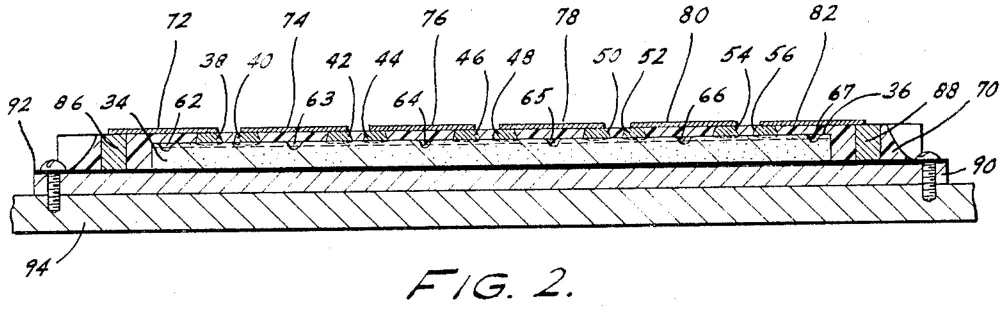
Figure 3:
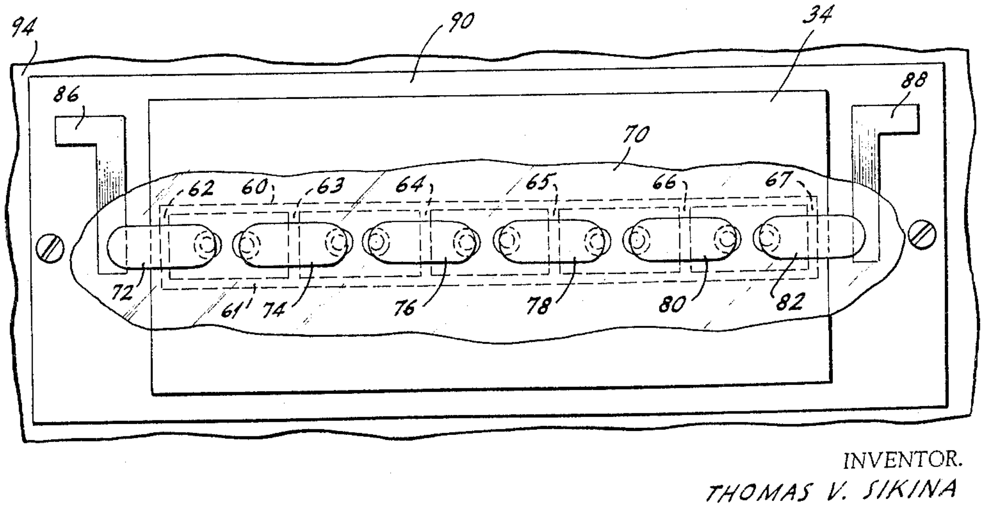
Figure 5:
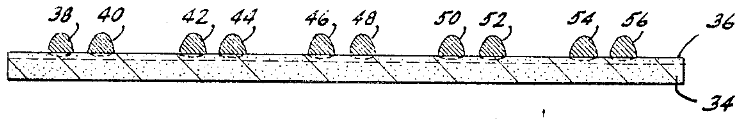
Figure 6:
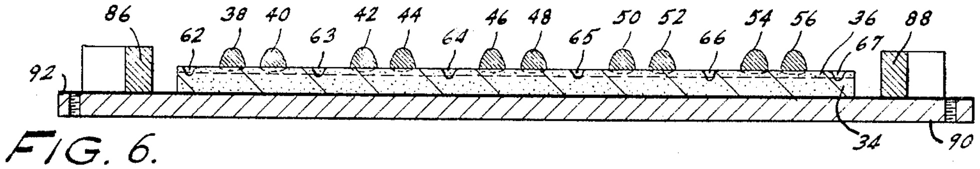
Figure 7:
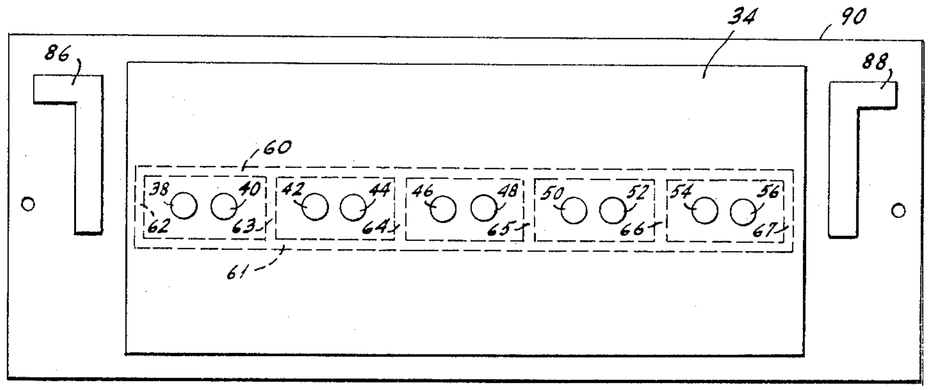

Other objects and features of the invention will be more readily comprehended from a consideration of the following detailed description in connection with the accompanying drawings which are not necessarily to scale, and in which:

FIGURE 1 is a schematic representation of the electrical circuit provided by an assembly constructed in accordance with the invention in one of its forms;

FIGURES 2 and 3 are an elevational section and a plan view, respectively, of one embodiment of the invention; and FIGURES 4 through 6, 8 and 9 are sectional views, and FIGURE 7 is a plan view, of a semiconductor assembly in successive stages of fabrication in accordance with a preferred embodiment of the invention.

The invention will first be described by way of example only as it may be used in providing a part of a scale-of-five counter of the class described in an article entitled, "High Speed Scalers Using Tunnel Diodes," by Philip Spiegel appearing at page 754 of "Review of Scientific Instruments" for July 1960. The basic element of the circuit is a series connection of a plurality of tunnel diodes in the electrical configuration shown in FIGURE 1 hereof, wherein elements 10, 12, 14, 16 and 18 are tunnel diodes each exhibiting the negative resistance characteristics typical of such devices. With appropriate bias supplied from battery 20 by way of resistor 22, each pulse applied across the series array by way of input terminals 24, 26 produces a step of voltage between output terminals 28, 30, until a number of steps equal to the number of tunnel diodes has been produced. After the last step the output voltage is reset to its original value by means described in the above-identified article. The result is the production of one large output pulse for each set of five successive input pulses. In the interest of clarity and simplicity of exposition the invention will be described in detail as it may be applied in fabricating only the series array of five tunnel diodes enclosed in the dotted rectangle in FIGURE 1.

FIGURES 2 and 3 show the completed five-diode structure, corresponding elements being indicated by corresponding numbers in the two figures. The semiconductive wafer 34, which may be of single-crystalline gallium arsenide, is primarily of high-resistivity N-type characteristics but has a thin surface layer 36 of strongly P-type material. The thickness of this layer has been greatly exaggerated in the drawing in the interest of clarity. On the surface layer 36 and alloyed therewith are five pairs of connections—(38, 40), (42, 44), (46, 48), (50, 52), and (54, 56)—these pairs of connections corresponding respectively to tunnel diodes 10, 12, 14, 16 and 18 in FIGURE 1. More particularly connections 38, 42, 46, 50 and 54 are rectifying connections to surface layer 36 while connections 40, 44, 48, 52 and 56 are substantially ohmic, and each pair of adjacent rectifying and ohmic connections constitutes a diode which is forwardly biased when the rectifying connection thereof is negative with respect to the associated ohmic connection. Typically the connections are 5 to 8 mils in diameter and each rectifying connection is spaced from its associated ohmic connection by 3 to 5 mils. The five diode pairs are electrically isolated from each other so far as conduction through the semiconductive wafer is concerned by longitudinal channels 60 and 61 and transverse channels 62 through 67 each of which extends through the surface layer 36. Although in this embodiment the channels do not extend entirely through the wafer 34, the high resistivity of the underlying N-type material prevents the latter material from exerting any substantial shunting effect on the elements formed in the low-resistivity surface layer.

Adhering to and covering the wafer 34 and all but the uppermost surface of the diode connections is an insulating surround 70 of plastic material such as an epoxy resin, the uppermost surface of which is coplanar with the uppermost surfaces of the diode connections. Disposed upon this surface and adhering thereto are six evaporated metal interconnections 72, 74, 76, 78, 80 and 82, which may be aluminum coated with nickel and which provide the circuit interconnection of the diodes indicated in FIGURE 1. More particularly the four inner interconnections 74, 76, 78 and 80 each serve to connect the ohmic connection of one diode pair to the rectifying connection of the next diode pair while the outermost interconnections 72 and 82 provide interconnections to the two terminal bars 86 and 88, which may be nickel bars also having their uppermost surfaces coplanar with the top of the plastic surround.

The semiconductive wafer 34 and the terminal bars 86 and 88 are supported upon a metal base plate 90 preferably having high thermal conductivity, but are electrically insulated therefrom by a thin layer of bonding material 92, such as fused glass or beryllium oxide. The entire integral structure thus far described may then be mounted in any convenient manner, preferably with the exposed undersurfaces of base plate 90 in good thermal contact with a heat sink such as the metal chassis 94.

Further in accordance with the invention the device of FIGURES 2 and 3 is preferably fabricated in the manner now to be described with particular reference to FIGURES 4 to 9, in which elements corresponding to those of FIGURES 2 and 3 are indicated by corresponding numerals.

Figure 4:
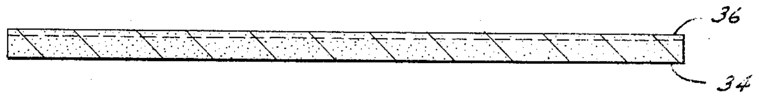

First, a wafer 34 of a single-crystalline N-type gallium arsenide is provided on its upper surface with the thin P-type region 36 shown in FIGURE 4. The original wafer 34 may for example be ⅜″ by ¼″ on its broad upper and lower faces, and may have a uniform thickness of about 20 mils. Typically the resistivity of the original wafer is about 100 ohm-centimeters.

To form the surface layer the upper surface of the wafer 34 is optically polished to produce a mirror finish and the polished surface is then subjected to a diffusion treatment, which may be as follows. The wafer 34 is placed in a small quartz box containing 0.1 to 0.5 gram of pure zinc and heated in an inert atmosphere for one-half hour at about 900° C. to form a strongly P-type surface layer 36 having a depth of about 0.1 mil and containing about $10^{20}$ impurity centers per cubic centimeter. This general type of surface diffusion treatment is well known in the art and hence need not be described here in detail. Next the pattern of metal deposits required to make the rectifying and ohmic connections of the scale-of-five counter is deposited on the exterior of the diffused surface layer 36. Preferably this is accomplished by vacuum evaporation of tin through a photolithographically prepared metal mask containing apertures corresponding to the locations in which tin is to be deposited on the wafer. Small indium-cadmium eutectic solder pellets are placed upon the deposits which are to constitute ohmic connections 40, 44, 48, 52 and 56, while small tin pellets are placed upon the alternate deposits which are to constitute the rectifying connections 38, 42, 46, 50 and 54. Typically these pellets are about 5 mils in diameter. This assembly is then heated for from about 10 seconds to one minute at about 500° C. in a hydrogen atmosphere to alloy the deposits and the pellets with the surface layer 36. After cooling, the array of alternate rectifying and ohmic connections shown in FIGURE 5 is obtained, the alloy regions indicated by the dotted lines under each connection extending only part way through the P-type surface layer.

The tin pellets used in alloying make the alloy regions under connections 38, 42, 46, 50 and 54 N-type so that rectifying connections to the P-type surface layer are formed thereby, while the indium-cadmium pellets alloyed with the tin deposits leave P-type regions under connections 40, 44, 48, 52 and 56 making these connections ohmic. Typically the connections extend about 5 mils above the surface of the wafer after alloying.

Referring now to FIGURES 6 and 7, next the wafer 34 bearing the rectifying and ohmic connections is fastened to metal base plate 90, which may be of aluminum or similar heat-conducting material. Since it is usually desirable that the assembly of ohmic and rectifying connection be capable of operation independently of the potential of the base plate 90, it is preferred to provide a thin electrically-insulating material between base plate 90 and semiconductive wafer 34 which material can also be used to bond the wafer to the base plate. To this end the upper surface of base plate 90 is preferably covered with a thin layer of insulating bonding material such as glass or beryllium oxide and heated to soften the bonding material, at which time the wafer 34 is placed on the layer of bonding material so that when the bonding material has cooled and solidified the wafer 34 is bonded to, but insulated from, the base plate 90 by the layer 92. Preferably two terminal bars 86 and 88 of a conductive material such as nickel are at the same time and in the same manner bonded to, but insulated from, the base plate 90 in the position shown in FIGURES 6 and 7.

In order to provide electrical isolation between the diode pairs on the surface layer 36, channels 60 through 67 are provided through the layer 36 separating each diode pair from the other. Without such isolation the low-resistivity layer 36 will connect directly together the base elements of all of the diode pairs, and circuits requiring separate base connections such as the pulse counter now being described would not be possible. While the necessary isolation can be provided by selectively etching or sandblasting channels completely through wafer 34 it is only necessary in my process to provide channels deep enough to extend through the surface layer 36 as shown in FIGURES 6 and 7. It will be understood that while the channels as shown in the figures appear deep and narrow, this is only because the thickness of the surface layer has been greatly exaggerated in the drawing. Actually the layer 36 is typically about 0.1 mil thick and hence can readily be removed by very shallow cutting into the surface to separate the circuit elements into any desired configuration.

Following this isolating of the diode pairs, the diode elements are cleaned briefly in a mixture of 3 parts HF to 1 part $HNO_3$, rinsed and dried.

Figure 8:
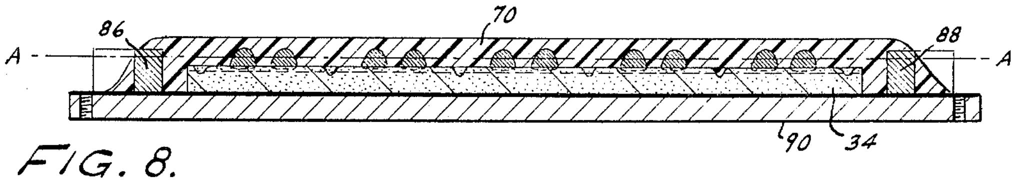
Figure 9:
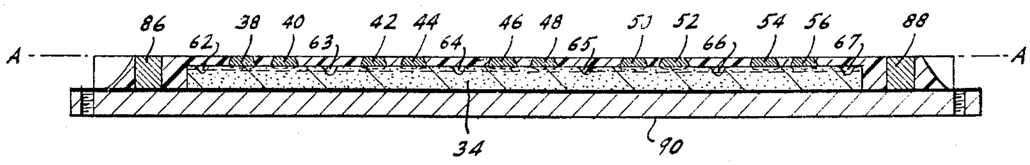

Next, referring particularly to FIGURE 8, the wafer 34, the ohmic and the rectifying connections and preferably also the terminal bars 86 and 88 are embedded in a plastic surround 70. This may readily be accomplished by covering these elements with a liquid which on hardening provides an adherent insulating surround. A preferred material for this purpose is epoxy resin, although glass may also be used. While the liquid material may be applied by holding a retaining mold around the elements to be covered and pouring the liquid material into the mold to the required depth, it is equally effective and simpler in many cases to use a viscous resin and merely paint it over the elements to be covered, the high viscosity of the material and the small height of the elements involved making this readily possible.

After the insulating surround has hardened the assembly shown in FIGURE 8 is subjected to a lapping or milling operation applied from the top so as to remove material from the assembly in planes parallel to the plane A—A passing through each of the connections to wafer 34. For example the semiconductor assembly may be disposed horizontally as shown and the lapping or milling tool rotated about a vertical axis and moved vertically downward until the plane surface A—A is exposed, producing the structure shown in FIGURE 9. The tops of the rectifying and ohmic connections are thereby exposed and lie in the same plane A—A as the exposed surface of the insulating surround. Typically the connections extend about 2 mils above the wafer 34 when machining is completed.

The rectifying and ohmic connection and the terminal bars are then interconnected to produce the desired circuit by evaporating aluminum through a metal mask in the required pattern. Preferably the deposited aluminum is covered with a layer of nickel in the same pattern and produced by similar evaporation through the same mask. The pattern of the interconnections used to produce the circuit of FIGURE 1 is shown in FIGURES 2 and 3, terminal bars 86 and 88 being interconnected with connections 38 and 56 respectively and connections 40, 44, 48 and 52 being interconnected with connections 42, 46, 50 and 54 respectively. To ensure best electrical contact between the deposited interconnections and the connections to the wafer 34 the material of the connections is preferably one which does not oxidize readily prior to application of the interconnections thereto.

The various advantages and features of my novel fabrication process and device will be more readily appreciated in view of the foregoing. Any desired pattern and number of elements can readily be formed on the semiconductive wafer by known techniques such as evaporation, photolithography, silk-screening or chemical or electrolytic plating, followed by alloying where required. These elements can then be separated into any desired grouping suitable for the electrical function desired by merely forming appropriate channels in the wafer. A planar surface suitable for making any desired interconnections can then be formed by embedding the connections in a surround and removing part of the surround and of the connections along a predetermined plane. Any desired pattern of interconnections can then be formed on this surface, again by techniques such as evaporation, photolithography, silk-screening or plating. Since all of these processes may be performed from the same side of the wafer, the suitability of the process for mass production is further enhanced. The resultant device is very compact and resistant to acceleration and is adapted to facilitate transmission to a mounting surface of heat generated therein during operation. In addition the critical semiconductor surfaces are covered and protected from harmful contamination by the insulating surround 70.

Many devices differing materially from that with reference to which the invention has been described may be made by the method of the invention. Among them are devices using not only diodes but also transistors, the rectifying emitter and collector elements and the ohmic base connection being formed on the same surface of the semiconductive wafer.

Further, while the specific embodiment described hereinbefore uses an original semiconductive wafer of N-type materials, high-resistivity P-type material may be used instead as a starting material, or if desired the entire original wafer can be P-type instead of using a thin surface layer of P-type material and the isolating channels cut completely through the wafer. Similarly the portion of the wafer to which the connections are made can be made N-type instead of P-type, in which case the materials used to make rectifying and ohmic connections will be interchanged. It will also be understood that the invention is not limited to the use of gallium arsenide, other semiconductor materials such as germanium and silicon also being suitable for use in the invention with appropriate modification of the details of the fabrication process, and that connections other than alloy connections—for example surface-barrier connections—may also be used.

Although the invention has been described with particular reference to a specific embodiment thereof it will be understood that it may be practiced in any of a variety of other diverse forms without departing from the scope of the invention as defined by the appended claims.

I claim:

1. A microminiaturized semiconductor counter circuit assembly comprising a wafer of high-resistivity gallium arsenide having a thin, strongly P-type surface layer, a plurality of pairs of alloyed metal connections to said surface layer, each of said pairs comprising one ohmic and one rectifying connection associated to form a tunnel diode, an adherent, electrically insulating surround of solidified material extending over said surface layer and between said connections, the surface of said surround and the external surfaces of said connections forming a common planar surface, and a plurality of deposited metallic interconnections adhering to said planar surface, each of said interconnections extending between said rectifying connection of one of said pairs and said ohmic connection of another of said pairs.

2. A semiconductor circuit assembly comprising a wafer of semiconductive material having a thin surface layer of low resistivity and an underlying layer of high resistivity, a plurality of pairs of alloyed metal connections to said surface layer, each of said pairs comprising an ohmic connection and a rectifying connection associated with said surface layer to form a diode device, a plurality of channels through said surface layer separating said pairs of connections, an adherent electrically-insulating surround of solidified material extending over said surface layer and between said connections, the surface of said surround and the external surfaces of said connections together forming a common planar surface, and a plurality of deposited metallic interconnections of planar form adhering to said planar surface, each of said interconnections extending between a connection of one of said pairs and a connection of another of said pairs.

3. A semiconductor circuit assembly comprising a wafer of semiconductive material having a thin surface layer of low resistivity, a plurality of semiconductor devices each comprising metal connections to said surface layer including an ohmic connection and a rectifying connection, a plurality of channels through said layer separating said devices from one another, an adherent electrically-insulating surround of solidified material extending over said surface layer and between said connections, the surface of said surround and the external surfaces of said connections together forming a common planar surface, and means interconnecting said devices comprising a plurality of deposited metallic interconnections of planar form adhering to said planar surface and engaging said metal connections of the interconnected devices.

4. A semiconductor circuit assembly in accordance with claim 3, in which a metallic body of low thermal impedance is mounted adjacent the face of said wafer opposite said surface layer and in intimate thermal connection therewith.

5. A semiconductor circuit assembly in accordance with claim 3, in which the portion of said wafer underlying said surface layer is of high resistivity.

References Cited by the Examiner

UNITED STATES PATENTS

| | | | |
|---|---|---|---|
| 2,875,505 | 3/1959 | Pfann | 29—25.3 |
| 2,985,804 | 5/1961 | Buie | 317—235 |
| 3,012,175 | 12/1961 | Jones et al. | 317—237 |
| 3,026,501 | 3/1962 | Gray | 317—238 X |
| 3,038,085 | 6/1962 | Wallmark et al. | 307—88.5 |
| 3,074,145 | 1/1963 | Rowe | 29—25.3 |
| 3,087,098 | 4/1963 | Taylor | 317—234 |
| 3,100,276 | 8/1963 | Meyer | 317—234 |
| 3,117,260 | 1/1964 | Noyce | 317—235 |
| 3,158,788 | 11/1964 | Last | 317—101 |
| 3,187,193 | 6/1965 | Rappaport et al. | 307—88.5 |

JOHN W. HUCKERT, *Primary Examiner.*

SAMUEL BERNSTEIN, *Examiner.*

J. D. KALLAM, A. S. KATZ, R. SANDER, *Assistant Examiners.*